June 12, 1951 H. T. BUDENBOM 2,556,673
COMPOSITE SCANNING SYSTEM FOR OBJECT LOCATION
Filed April 17, 1947 2 Sheets-Sheet 1
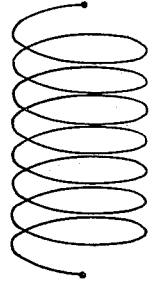
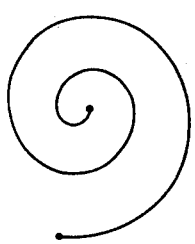
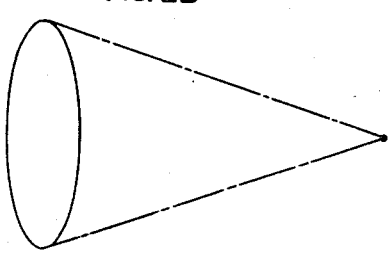
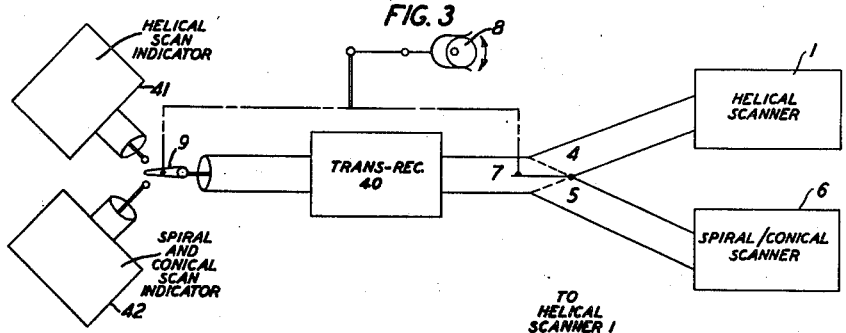
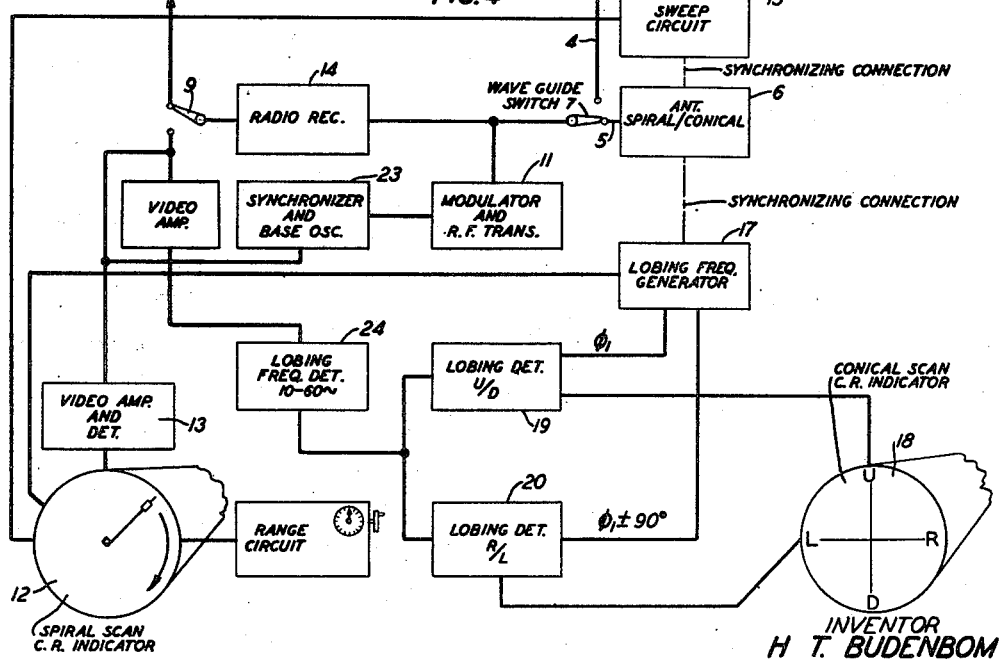
INVENTOR
H. T. BUDENBOM
BY N. S. Ewing
ATTORNEY June 12, 1951  H. T. BUDENBOM  2,556,673
COMPOSITE SCANNING SYSTEM FOR OBJECT LOCATION
Filed April 17, 1947  2 Sheets-Sheet 2
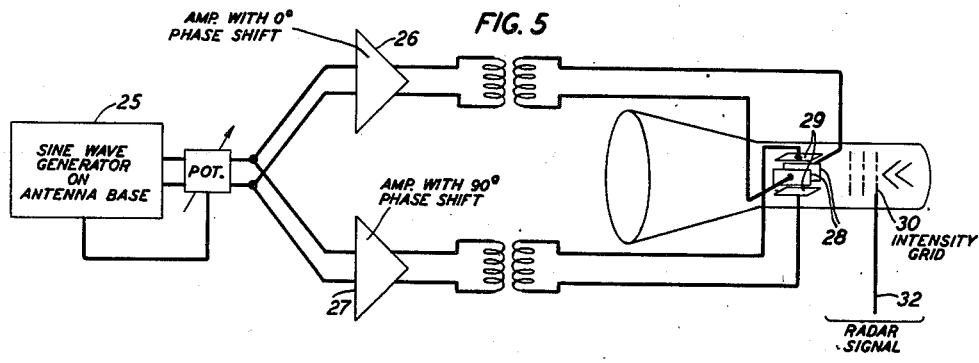
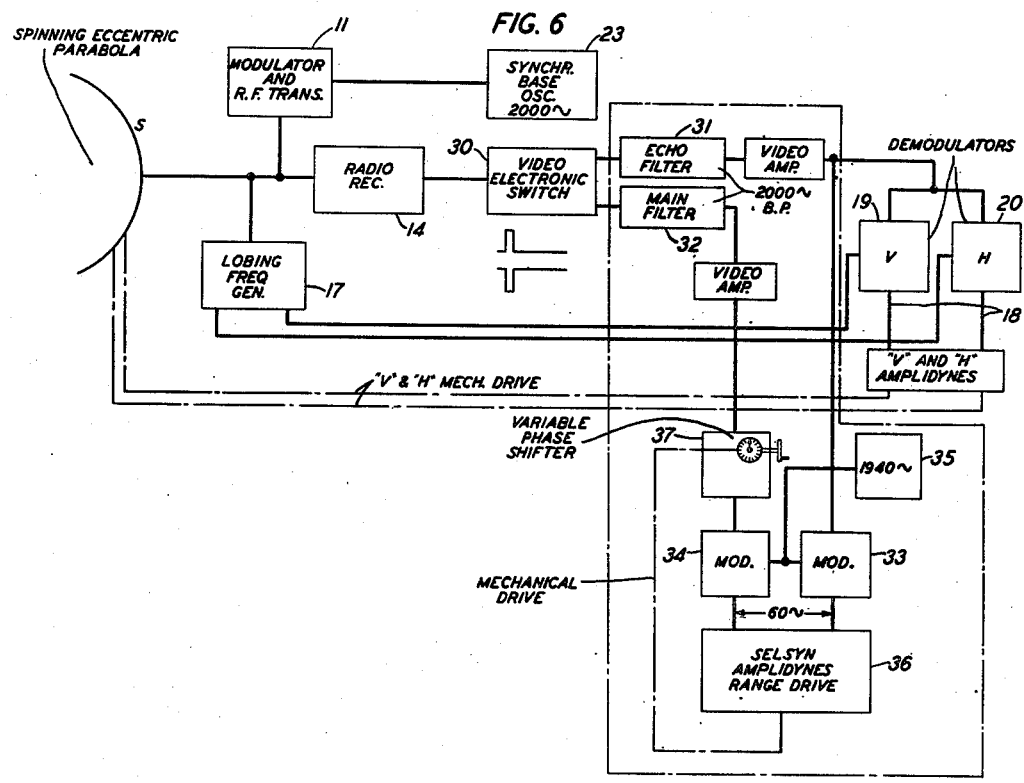
INVENTOR
H. T. BUDENBOM
BY
ATTORNEY Patented June 12, 1951

2,556,673

UNITED STATES PATENT OFFICE 2,556,673

COMPOSITE SCANNING SYSTEM FOR OBJECT LOCATION

Horace T. Budenbom, Short Hills, N. J., assignor to Bell Telephone Laboratories, Incorporated, New York, N. Y., a corporation of New York Application April 17, 1947, Serial No. 742,089

2 Claims. (Cl. 343—16)

This invention relates to composite and universal scanning systems for radio object location and detection.

A principal object of the invention is to scan by means of radio beams a wide field for search purposes during a portion of a single scan cycle, and a narrow field for detection of targets and/or automatic tracking thereof during the remaining idle portion of said cycle.

Another object of the invention is to composite a helical scan for wide field search, with a longer range, spiral scan for narrower field detection of targets.

Another object of the invention is to composite a wide field, helical scan with a relatively narrow field, spiral scan, the latter being further modified into a conical scan of a few degrees for automatic tracking.

Referring to the figures of the drawing:

Fig. 1 shows a helical trace described by a radar beam;

Fig. 2A shows a spiral traced by a radar beam;

Fig. 2B shows a circular trace for automatic tracking;

Fig. 3 shows a schematic circuit of a composite helical and spiral (or conical) scanning system;

Fig. 4 shows a composite helical and spiral (or conical) radar circuit in block diagram form;

Fig. 5 shows a spiral scan indicator circuit; and

Fig. 6 shows a range measuring circuit in block schematic form.

A composite scanning system in accordance with an embodiment of the invention, comprises a helical scanner and a spiral scanner involving two paraboloidal antenna systems, each having a fixed focus feed horn radiator. The antenna system which scans helically has the axis of its paraboloidal reflector more or less horizontal. If this paraboloid were revolved about a vertical axis, the radiated beam therefrom would tend to describe a circular trace in space. However, actually the paraboloid is tilted or canted while rotated, so that the beam scans helically and covers a wide angular area (for searching), for example, about 180 degrees in azimuth and 75 degrees (−15 degrees to +60 degrees) in elevation.

Helical scanning systems of the prior art have in general only utilized the forward 180 degrees of each revolution, with a consequent waste of the time involved in the remaining half cycle. In accordance with the present invention, this idle wasted time is utilized for the purpose of narrow field acquisition of targets and automatic tracking.

In the system contemplated by the invention, use is actually made of the helically scanning system only during the forward 180 degrees of each revolution, whereupon the transmitter and receiver therefor are switched to the second antenna during the remaining back half of each cycle for spiral or conical scanning.

The spiral-conical antenna system comprises a separate paraboloidal reflector and a fixed focus feed horn, and is used to scan either spirally or conically. The radiated beam therefrom primarily describes a spiral pattern in space, covering however a considerably smaller area, for example, 30 degrees by 30 degrees, for the acquisition of targets. An increased range is obtained with this spiral scan due to the concentration of the energy in a smaller area. Finally, by modifying the spiral trace into a circular scan of a few degrees, the radiated beam describes a narrow cone in space, whereby the second paraboloid becomes available for automatic tracking. Both the spiral and conical scan involve rotation of the latter paraboloid about its principal axis and the transition from one to the other may be made at will.

In operation, the helical scan is available for wide field searching at all times. During search it will be supplemented by the longer range, spiral scan of narrower fields for the acquisition of targets as previously noted. As soon as the target is located by the spiral scanner, it can be watched for on the helical scan indicator. As soon as it becomes apparent there, the spiral scanner can be switched over to a conical scan for automatic tracking. At the same time, the wide area, helical scanner will be searching for other targets, while the acquired target is being tracked and the beam set directly thereon.

A composite scanning system in accordance with the invention contemplates motions of the antenna system to trace helical, spiral or conical patterns in space.

Fig. 1 represents a geometrical space pattern traced by a helical scanning radio beam. Such a beam may be radiated from an antenna system comprising a paraboloidal reflector and a dipole or wave guide feed, wherein the paraboloid is rotated continuously in azimuth and concomitantly tilted or nodded in elevation or vice versa. A helical scan may, for example, be performed by the antenna system disclosed in the application of Baxter and Budenbom Serial No. 742,090 concurrently filed herewith which issued August 23, 1949, as Patent No. 2,479,897.

Fig. 2A represents the geometrical space pattern traced by a spiral scanning beam. A spiral beam may be radiated from an antenna system such as is disclosed in the United States application of M. Fritts, Serial No. 637,125, filed December 24, 1945 now Patent No. 2,537,822 granted January 9, 1951. A conical beam as illustrated in Fig. 2B may be radiated by an antenna system such as is disclosed in the United States application of A. P. King, Serial No. 499,450, filed August 21, 1943, or in the application of P. H. Smith, Serial No. 498,622, filed August 14, 1943 now Patent No. 2,542,844, granted February 20, 1951.

Fig. 3 shows in schematic form a composite helical and spiral or conical scan system in accordance with an embodiment of the invention.

The helical scanning antenna system 1 comprises a paraboloidal reflector and a wave guide feed horn at the focus thereof, similar in type to that disclosed in the United States application of A. P. King, Serial No. 509,155, filed November 16, 1943 which issued as Patent No. 2,427,005 on September 9, 1947.

The antenna system 1 may have the axis of the paraboloidal reflector more or less horizontal while the paraboloid itself is revolved about a vertical axis, and concomitantly tilted or canted a few degrees with respect to the feed axis for each sweep, by an arrangement more fully disclosed in Baxter-Budenbom Serial No. 742,090 filed April 17, 1947. Thereby the radiated beam traces out a helix in space. Use is actually made of the helical scanning system only during the forward 180 degrees of each revolution to scan a wide angular area, for example, 180 degrees in azimuth and 75 degrees (−15 degrees to +60 degrees) in elevation.

During the forward 180 degrees of each revolution, the helical scan antenna 1 is activated for transmission and reception by wave guide transfer switch 7, which concomitantly blocks wave guide branch 5 and spiral-conical scanner 6. During the back half of the scan cycle, the transmitter-receiver 40 is switched to the spiral-conical antenna 6, by means of the synchronized cam 8, which operates transfer switch 7 to block wave guide path 4 and unblock path 5. The cam 8 is rotated in synchronism with paraboloid 2 to permit flow of microwaves in branch 4 for only one-half of a revolution. The corresponding visual indicators 41, 42 are similarly switched by a cam-operated switch 9 to be active with their respective antennas 1, 6.

The spiral-conical antenna system 6, which comprises also a paraboloidal reflector and a fixed focus wave guide feed, may be used to scan spirally or conically by means of a mechanical arrangement more fully disclosed in Baxter-Budenbom 2-17. As there disclosed the transition may be made at will by means of a solenoid-operated cam arrangement. The radiated beam therefrom will trace a spiral pattern in space and scan a considerably smaller area, for example, 30 degrees by 30 degrees, to acquire targets, whereupon the spiral scan may be modified into a conical scan of a few degrees. In the conical scan, the radiated beam describes a cone in space and the antenna system 6 is then capable of automatic tracking. Since both the spiral and conical scan involve rotation of the second paraboloidal reflector about its principal axis, the transition may be effected by means of a solenoid operated cam arrangement, as more fully described in the aforesaid application of Baxter and Budenbom.

The composite helical and spiral or conical radar system is shown in further detail by the block diagram of Fig. 4. The helically scanning radar portion which may be of the conventional form, known generally as SCR-520 or SCR-720 or the like, is shown schematically in Fig. 4 as comprising helical scanner 1, indicator 41 and auxiliary apparatus.

Referring specifically to Fig. 4 for details of the spiral-conical radar, a radio frequency transmitter and modulator (11), which may be of conventional form is shown for applying pulsed microwave energy to a branching wave guide which feeds alternately the scanners 1 and 6 as explained for Fig. 3. The modulator establishes the system pulse rate and the necessary keying and synchronizing pulses are supplied to the other units by the synchronizer and base oscillator 23. The R. F. transmitter is keyed by pulses from the modulation generator and in turn produces pulses of microwave energy of short duration. The transmitter comprises any suitable form of pulser such as the hydrogen thyratron, hard tube modulator, non-linear coil pulser, etc., and a magnetron oscillator. The output from the magnetron is fed through a main wave guide into a Y branch wave guide, whose diverging sections 4, 5 feed respectively the helical antenna 1 and the spiral or conical antenna 6 in alternation. The transfer wave guide switch 7 is synchronized with the antennas to alternately block the one wave guide channel or the other of the Y branch.

When the radiated helical and spiral or conical beams are intercepted by targets, echo pulses are reflected therefrom and reach the antennas 1 and 6. The interval between pulses is long enough to permit an echo to return from a target at maximum desired range before the next pulse is transmitted.

Reflected echoes, picked up by the helical antenna 1 are fed through the wave guide channel 4 of the Y branch wave guide to a crystal converter radio receiver 14 and thence to a class B helical scan indicator 41, or oscilloscope, of well-known construction (not shown).

Reflected echoes picked up by the spiral or conical antenna 6 are fed to the same radio receiver 14, where they are beat in a crystal converter with a local microwave oscillator, to provide 60-megacycle intermediate frequency pulses. An intermediate frequency amplifier and second detector 13 produce a video output, which is applied to the spiral scan cathode ray tube indicator 12. This indicator also has supplied thereto sweep voltages derived from a two-phase generator and linked potentiometer connected to the antenna 6 as illustrated by block 15.

Referring again to Fig. 4, the conical scan indicator 18 is an oscilloscope for indicating the pointing error in conical scanning. When the spiral scan is modified into a conical scan, the radio beam is deflected a fraction of a beam width from the axis of the paraboloid and thus describes a cone in space. When the pointing is correct, i. e., when the axis of the paraboloid points directly at the target, the amplitude of the returned pulses will be the same in all phases of the paraboloid's rotation.

A two phase, 30-cycle generator 17 (Figs. 4 and 6), which may be referred to as a "lobing frequency generator," synchronized with the rotation of the spiral or conical scanning antenna, serves in a manner to be described to provide an indication of the phase of nutation. When the pointing is not correct, the amplitude of the received pulses varies over a cycle as the paraboloid is rotated, the variation being greater with increasing error in pointing.

Suitable demodulators 19, 20, which may be referred to as "lobing detectors," translate the two phase voltages and the envelope of the pulse amplitude variations into direct current components which, when applied to the deflection plates of the indicator 18, serve to indicate the direction and approximate magnitude of the pointing error.

One of the two voltages $\Phi_1$ is applied from lobing generator 17 to detector 19 and the other voltage $\Phi_2$ displaced in phase by 90 degrees is applied to detector 20. The pulses of intermediate frequency derived from receiver 14 are transmitted through a suitable video amplifier to a lobing frequency detector 24, the output of which is a current varying in conformity with the envelope of the pulse amplitude variation.

The outputs of demodulators 19, 20 control the vertical and horizontal deflection respectively of the spot on the screen of the conical scan indicator 18, analogous to the manner disclosed in the United States application of O. E. De Lange Serial No. 504,577 filed October 1, 1943 which issued as Patent No. 2,426,182 on August 26, 1947.

When the axis of the spiral or conical paraboloid 6 intersects the target, there will be no 30-cycle modulation of the echo signals. This condition produces equal voltages and moves the spot on the oscilloscope screen to the central position, indicating that pointing is correct.

Fig. 5 shows the spiral indicator circuit in greater detail.

The spiral scan indicator 12, as shown, is a cathode ray oscilloscope, to whose deflection plates suitably modulated sinusoidal voltages displaced 90 degrees in phase are applied in the usual manner to cause the electron beam to trace spiral curves on the cathode ray screen.

Referring to Fig. 5, a sine wave generator 25, coupled to the antenna 6 provides a pure sine wave voltage, which is modulated by a variable potentiometer P synchronized with the rotation of the antenna. The sinusoidal voltage thus modulated is then branched and fed into two amplifiers 26, 27. The amplifier 26 provides a zero phase shift, while the amplifier 27 provides a 90-degree phase shift. The outputs of the amplifiers are respectively applied to the vertical and horizontal deflecting plates 28, 29 of the cathode ray tube 12. The intensity control grid 30 of the cathode ray tube is connected to the output lead extending from block 13 of Fig. 4 whereby the radar signals, as received, brighten the trace of the spirally scanning electronic beam on the cathode ray tube screen.

Alternatively, in place of the single phase generator 25, it is contemplated that a two-phase generator as shown in the United States application of O. E. De Lange, Serial No. 504,577 filed October 1, 1943, may be used with identical characteristic amplifiers to feed the deflecting plates 28, 29 of the cathode ray tube.

The simplest method of displaying range on the spiral scan indicator 12 is in terms of the cathode beam's radial displacement from the center by the echo pulse signal as in a plan position indicator. However, the output of the automatic ranging circuit to be subsequently described in Fig. 6 may also be used in Fig. 4 either to put an adjustable fiducial mark on the cathode ray tube screen, or through a Selsyn range output drive described below, to operate, via a servoamplifier, the shaft of a range indicating dial.

The latter form of range measuring circuit is shown in dotted lines in Fig. 6 in association with a conical scan system. Here the output of the radio receiver 14 is shown connected to an electronic switch 30, which functions to separate the transmitted pulse and return echo pulse. The echo and transmitted pulse series after separation, are passed through twin 2,000-cycle bandpass filters 31, 32. The outputs of these two filters will be 2,000-cycle sinusoidal waves, with the echo sinusoid lagging behind the transmitted pulse sinusoid by a phase angle directly proportional to the range. The echo branch filter 31 will also remove much of the background noise, thereby improving the signal to noise ratio.

For range control purposes, the outputs of the main and echo branch filters 31, 32 are fed to respective modulators 33, 34, each of which is also supplied, for example, with 1,940 or 2,060-cycle voltage, from an auxiliary oscillator 35. The resulting 60-cycle output is used to operate a Selsyn-amplidyne type of range drive 36. This range drive is shown mechanically connected back to a phase shifter circuit 37 placed in the main filter branch to adjust the phase shift thereof. Torque will cease when the mechanical operation of the phase shifter has brought the two 60-cycle output voltages into phase coincidence.

In Fig. 6, the directional indication associated with the spinning parabola is derived by taking a portion of the echo filter's output and feeding it to the inputs of the two conjugate demodulators 19, 20. The respective common or longitudinal legs of these two demodulators are fed by the two phases furnished by the two-phase generator 17, which as previously explained is geared to the parabola drive shaft. The outputs of these two demodulators 19, 20 will be direct current voltages, which may be applied to mechanical gun control drives, as of the "Amplidyne" type, and to automatic aiming of the parabola itself.

If desired, mechanical gun control drives may be provided in the system of Fig. 4 for the purpose of automatic aiming of the tracking parabola in the manner disclosed in the system of Fig. 6.

What is claimed is:

1. A composite radio object locating system comprising a radio transmitter, a first, continuously rotating directive antenna, energizing means synchronized with the rotation of said antenna for coupling said antenna to said transmitter during recurring intervals such that said antenna scans a wide field, a second, independently continuously rotatable directive antenna adapted to scan a relatively narrower field within said wide field, switching means for intermittently coupling said second antenna to said transmitter during the intervals between said first mentioned intervals, a radio receiver coupled to receive alternately from said antennas radio wave energy transmitted from said antennas to distant objects and reflected therefrom, indicator means connected to said receiver and responsive to reflected wave energy intercepted by said first antenna for visually indicating the presence and direction of reflecting objects in said wide field, and indicator means connected to said receiver and responsive to reflected wave energy intercepted by said second antenna for simultaneously visually indicating the presence and direction of a reflecting object within said narrower field.

2. The structure of claim 1, wherein each of said scanning antennas comprises a movable paraboloidal reflector and a fixed wave guide feed.

HORACE T. BUDENBOM.

REFERENCES CITED

The following references are of record in the file of this patent:

UNITED STATES PATENTS

| Number | Name | Date |
| --- | --- | --- |
| 2,231,929 | Lyman | Feb. 18, 1941 |
| 2,409,448 | Rost | Oct. 15, 1946 |
| 2,410,831 | Maybarduk | Nov. 12, 1946 |
| 2,415,094 | Varian | Feb. 4, 1947 |
| 2,416,562 | Alexanderson | Feb. 25, 1947 |
| 2,446,024 | Porter | July 27, 1948 |
| 2,473,175 | Ridenour | June 14, 1949 |